United States Patent
Rieschl et al.

(10) Patent No.: US 6,799,156 B1
(45) Date of Patent: Sep. 28, 2004

(54) METHOD AND DESIGN FOR A DVD SCSI TAPE CONTROLLER

(75) Inventors: Michael J. Rieschl, Cottage Grove, MN (US); Carl R. Crandall, Hugo, MN (US); Thomas N. Devries, Apple Valley, MN (US); Haeng D. Park, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 145 days.

(21) Appl. No.: 10/133,261

(22) Filed: Apr. 26, 2002

(51) Int. Cl.[7] .......................... G06F 9/455; G06F 13/00
(52) U.S. Cl. ........................ 703/24; 703/23; 703/25; 703/26; 703/27; 710/62; 710/72; 710/74; 711/111; 360/48
(58) Field of Search .......................... 360/92, 93, 132, 360/48; 369/272, 291; 703/23, 27; 711/4, 111, 112, 115; 710/302, 62–64, 72, 74

(56) References Cited

U.S. PATENT DOCUMENTS

| | | | | |
|---|---|---|---|---|
| 5,297,124 A | * | 3/1994 | Plotkin et al. | 360/49 |
| 5,313,617 A | * | 5/1994 | Nakano et al. | 703/24 |
| 6,490,648 B1 | * | 12/2002 | Kaneda et al. | 711/4 |
| 2003/0135672 A1 | * | 7/2003 | Yip et al. | 710/72 |

* cited by examiner

Primary Examiner—Jeffrey Gaffin
Assistant Examiner—Tanh Nguyen
(74) Attorney, Agent, or Firm—Charles A. Johnson; Mark T. Starr; Nawrocki, Rooney & Sivertson, P.A.

(57) ABSTRACT

A method of and apparatus for efficiently and effectively coupling a newly designed peripheral device to a legacy data processing system. The approach utilizes emulation of a SCSI tape device by a SCSI DVD device. Through device emulation, system-wide modifications are minimized.

20 Claims, 12 Drawing Sheets

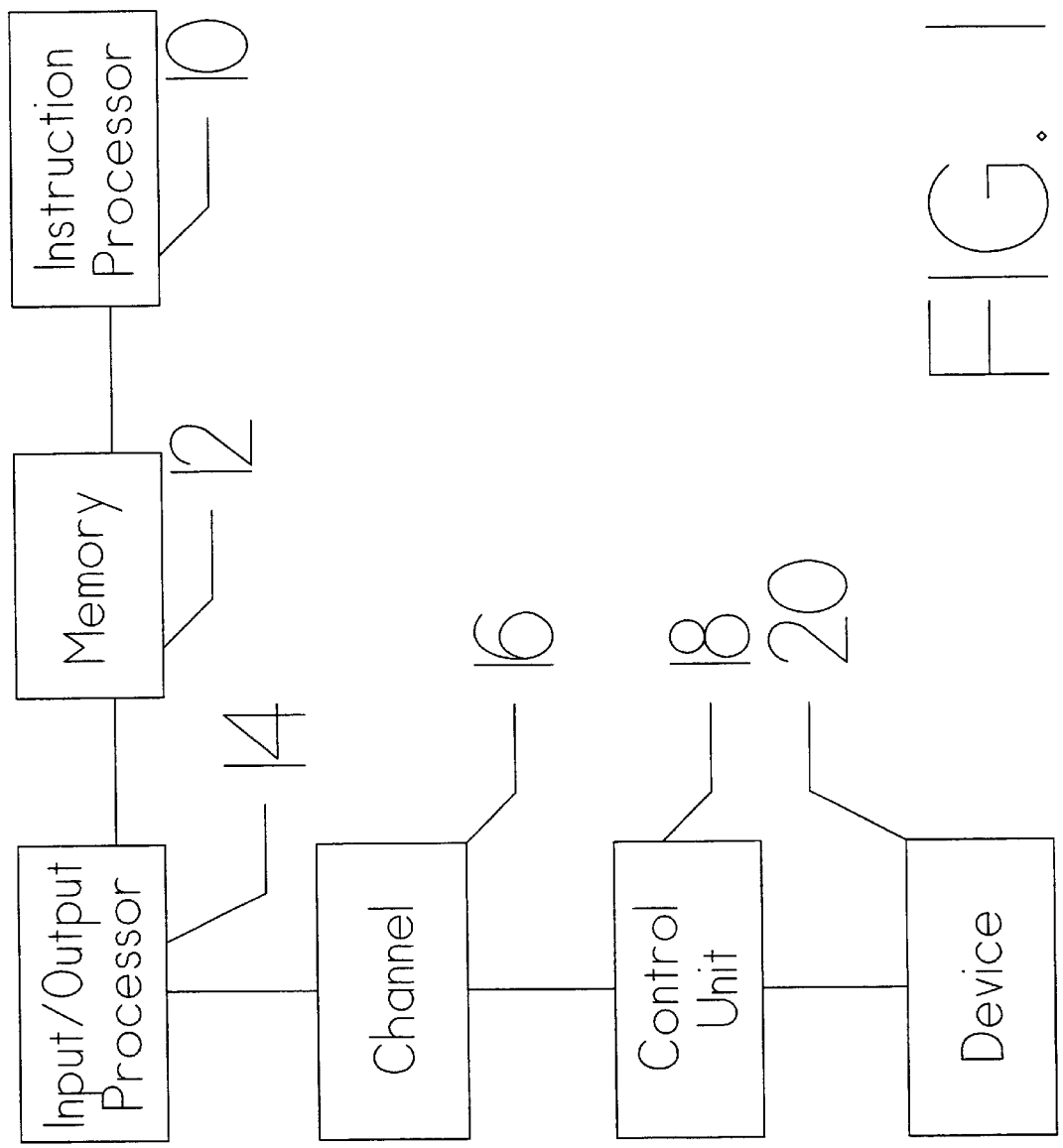

| 7 | 6 | 5 | 4 | 3 | 2 | 1 | 0 |
|---|---|---|---|---|---|---|---|
| Channel_Control | | | | Minor_Command | | Major_Command | |
| Word_Count | | | | | | | |
| Reserved | | | | | | | |
| Buffer_Address | | | | | | | |

| 7 | 6 | 5 | 4 | 3 | 2 | 1 | 0 |
|---|---|---|---|---|---|---|---|
| \multicolumn{8}{|c|}{Operation Code (00h)} |
| \multicolumn{3}{|c|}{LUN} | \multicolumn{5}{c|}{Reserved (0)} |
| \multicolumn{8}{|c|}{Reserved (0)} |
| \multicolumn{8}{|c|}{Reserved (0)} |
| \multicolumn{8}{|c|}{Reserved (0)} |
| \multicolumn{3}{|c|}{Unused (0)} | \multicolumn{3}{c|}{Reserved (0)} | Flag | Link |

FIG. 4A

| 7 | 6 | 5 | 4 | 3 | 2 | 1 | 0 |
|---|---|---|---|---|---|---|---|
| \multicolumn{8}{|c|}{Operation Code (01h)} |
| \multicolumn{3}{|c|}{LUN} | \multicolumn{4}{c|}{Reserved (0)} | Immed |
| \multicolumn{8}{|c|}{Reserved (0)} |
| \multicolumn{8}{|c|}{Reserved (0)} |
| \multicolumn{8}{|c|}{Reserved (0)} |
| \multicolumn{3}{|c|}{Unused (0)} | \multicolumn{3}{c|}{Reserved (0)} | Flag | Link |

FIG. 4B

| 7 | 6 | 5 | 4 | 3 | 2 | 1 | 0 |
|---|---|---|---|---|---|---|---|
| \multicolumn{8}{c|}{Operation Code (03h)} |
| \multicolumn{3}{c|}{LUN} | \multicolumn{5}{c|}{Reserved (0)} |
| \multicolumn{8}{c|}{Reserved (0)} |
| \multicolumn{8}{c|}{Reserved (0)} |
| \multicolumn{8}{c|}{Allocation Length} |
| \multicolumn{2}{c|}{Unused (0)} | \multicolumn{4}{c|}{Reserved (0)} | Flag | Link |

FIG. 5A

| 7 | 6 | 5 | 4 | 3 | 2 | 1 | 0 |
|---|---|---|---|---|---|---|---|
| \multicolumn{8}{c|}{Operation Code (08h)} |
| \multicolumn{3}{c|}{LUN} | \multicolumn{3}{c|}{Reserved (0)} | SILI | Fixed |
| \multicolumn{8}{c|}{Transfer Length (MSB)} |
| \multicolumn{8}{c|}{Transfer Length} |
| \multicolumn{8}{c|}{Transfer Length (LSB)} |
| \multicolumn{2}{c|}{Unused (0)} | \multicolumn{4}{c|}{Reserved (0)} | Flag | Link |

FIG. 5B

| 7 | 6 | 5 | 4 | 3 | 2 | 1 | 0 |
|---|---|---|---|---|---|---|---|
| | Operation Code (11h) ||||||||
| LUN ||| Reserved (0) || Code |||
| | Count (MSB) ||||||||
| | Count ||||||||
| | Count (LSB) ||||||||
| Unused (0) || Reserved (0) |||||| Flag | Link |

FIG. 6A

| 7 | 6 | 5 | 4 | 3 | 2 | 1 | 0 |
|---|---|---|---|---|---|---|---|
| | Operation Code (12h) ||||||||
| LUN ||| Reserved (0) |||| EVPD |
| | Page Code ||||||||
| | Reserved (0) ||||||||
| | Allocation Length ||||||||
| Unused (0) || Reserved (0) |||||| Flag | Link |

FIG. 6B

| 7 | 6 | 5 | 4 | 3 | 2 | 1 | 0 |
|---|---|---|---|---|---|---|---|
| | Operation Code (15h) |||||||
| LUN ||| PF | Reserved (0) ||| SP (0) |
| | Reserved (0) |||||||
| | Reserved (0) |||||||
| | Parameter List Length |||||||
| Unused (0) || Reserved (0) |||| Flag | Link |

FIG. 7A

| 7 | 6 | 5 | 4 | 3 | 2 | 1 | 0 |
|---|---|---|---|---|---|---|---|
| | Operation Code (1Ah) |||||||
| LUN ||| Res(0) | DBD | Reserved (0) |||
| PC (0,1,2,3) ||| Page Code (0, 10h, 3fh) |||||
| | Reserved (0) |||||||
| | Allocation Length |||||||
| Unused (0) || Reserved (0) |||| Flag | Link |

FIG. 7B

| 7 | 6 | 5 | 4 | 3 | 2 | 1 | 0 |
|---|---|---|---|---|---|---|---|
| | Operation Code (4Dh) ||||||||
| colspan=3 | LUN ||| colspan=3 | Reserved (0) ||| PPC (0) | SP (0) |
| colspan=2 | PC (0,1,2,3) || colspan=6 | Page Count (0) ||||||
| | Reserved (0) ||||||||
| | Reserved (0) ||||||||
| | (MSB) Parameter Pointer (0) ||||||||
| | (LSB) Parameter Pointer (0) ||||||||
| | (MSB) Allocation Length ||||||||
| | (LSB) Allocation Length ||||||||
| colspan=2 | Unused (0) || colspan=4 | Reserved (0) |||| Flag | Link |

FIG. 8A

| 7 | 6 | 5 | 4 | 3 | 2 | 1 | 0 |
|---|---|---|---|---|---|---|---|
| colspan=2 | Reserved (0) || colspan=6 | Page Code (0) ||||||
| | Reserved (0) ||||||||
| | (MSB) Page Length (0) ||||||||
| | (LSB) Page Length (1) ||||||||
| | 00h ||||||||

FIG. 8B

| 7 | 6 | 5 | 4 | 3 | 2 | 1 | 0 |
|---|---|---|---|---|---|---|---|
| Operation Code (1Bh) ||||||||
| LUN ||| Reserved (0) |||| Immed |
| Reserved (0) ||||||||
| Reserved (0) ||||||||
| Reserved (0) ||||||| Load |
| Unused (0) ||| Reserved (0) ||| Flag | Link |

FIG. 9A

Header

| 7 | 6 | 5 | 4 | 3 | 2 | 1 | 0 |
|---|---|---|---|---|---|---|---|
| Sense Data Length ||||||||
| Media Type (0) ||||||||
| WP | Buffered Mode (0) ||| Speed (0) ||||
| Block Length (0 or 8) ||||||||

Block Descriptor

| Density (0) |
|---|
| (MSB) Number of Blocks (0) |
| Number of Blocks (0) |
| (LSB) Number of Blocks (0) |
| (LSB) Page Length (1) |
| Reserved (0) |
| (MSB) Block Length (0) |
| Block Length (0) |
| (LSB) Block Length (0) |

Page Descriptor

| PS (0) | 0 | Page Code (10h) |||||||
|---|---|---|---|---|---|---|---|---|
| Additional Page Length (0Eh) |||||||||
| Res (0) | CAP(0) || CAF(0) || Active Format (0) ||||
| Active Partition (0) |||||||||
| Write Buffer Full Ratio (0) |||||||||
| Read Buffer Full Ratio (0) |||||||||
| (MSB) Write Delay Time (0) |||||||||
| (LSB) Write Delay Time (0) |||||||||
| DBR (0) | BIS (0) | RS (0) | AVC (0) | SOCI (0) ||| RBO (0) | REW (0) |
| Gap Size (0) |||||||||
| EOD (0) ||| EEG (1) | SEW (0) | Reserved (0) ||||
| (MSB) Buffer Size at Early Warning (0) |||||||||
| Buffer Size at Early Warning (0) |||||||||
| (LSB) Buffer Size at Early Warning (0) |||||||||
| Select Data Compression Algorithm (0) |||||||||
| Reserved (0) |||||||||

FIG. 9B

|    | 7 | 6 | 5 | 4 | 3 | 2 | 1 | 0 |
|---|---|---|---|---|---|---|---|---|
| 0 | Valid | \multicolumn{7}{c}{70h (current error response code)} ||||||| |
| 1 | \multicolumn{8}{c}{0 (segment number)} ||||||||
| 2 | FM | EOM | ILI | 0 | \multicolumn{4}{c}{Sense Key} |||| |
| 3 | (MSB) | | | | | | | |
| 4 | \multicolumn{8}{c}{Information (bytes 3 through 6)} ||||||||
| 5 | | | | | | | | |
| 6 | | | | | | | | (LSB) |
| 7 | \multicolumn{8}{c}{26 (Additional Sense Length)} ||||||||
| 8 | \multicolumn{8}{c}{0 (8-11 Command Specific Information)} ||||||||
| 9 | \multicolumn{8}{c}{0} ||||||||
| 10 | \multicolumn{8}{c}{0} ||||||||
| 11 | \multicolumn{8}{c}{0} ||||||||
| 12 | \multicolumn{8}{c}{(ASC)} ||||||||
| 13 | \multicolumn{8}{c}{(ASCQ)} ||||||||
| 14 | \multicolumn{8}{c}{0 (Field replaceable unit code)} ||||||||
| 15 | SKSV | \multicolumn{7}{c}{0 (bytes 15-17 Sense-key specific)} ||||||| |
| 16 | \multicolumn{8}{c}{0} ||||||||
| 17 | \multicolumn{8}{c}{0} ||||||||
| 18 | NTEV | \multicolumn{7}{c}{0} ||||||| |
| 19 | \multicolumn{8}{c}{Windows File Error (errorn). Valid only if NTEV is set.} ||||||||
| 20-43 | \multicolumn{8}{c}{0} ||||||||

FIG. 10

| Sense Key | ASC (SBI2) | ASCQ(SBI3) | Description |
|---|---|---|---|
| 00h | 00h | 01h | FM |
| 00h | 00h | 02h | EOM |
| 00h | 00h | 04h | EOT |
| 02h | 04h | 00h | Not Ready |
| 03h | 30h | 02h | Medium Error-Incompatible media format |
| 03h | 00h | 80h | Medium Error-Read/Space command encountered at EOM |
| 04h | 44h | 00h | H/W Error-Microcode (CIO Interface error) |
| 05h | 20h | 00h | Illegal Request-Invalid command |
| 05h | 24h | 00h | Illegal Request-Invalid CDB |
| 06h | 00h | 00h | Unit Attention |
| 08h | 00h | 00h | Blanks Check |

FIG. 11A

| | 7 | 6 | 5 | 4 | 3 | 2 | 1 | 0 |
|---|---|---|---|---|---|---|---|---|
| 0 | Peripheral qualifier=000b | | | Peripheral device=01h (sequential device) | | | | |
| 1 | RMB=1 | 0 | | | | | | |
| 2-3 | EOM | | | 0 | | | | |
| 4 | Additional length - 1Fh | | | | | | | |
| 5-7 | 0 | | | | | | | |
| 8-15 | Vendor Identification (ASCII) = "UNISYS" | | | | | | | |
| 16-23 | Controller Product ID (ASCII) = "CUDVDT" | | | | | | | |
| 24-31 | Logical Unit Product ID (ASCII) = "DVDTP" | | | | | | | |
| 32-35 | Product Revision Level (ACSII)=Changes with each simulator release | | | | | | | |

FIG. 11B

| Segment Descriptor A (Control Block) |
|---|
| J tape blocks X blocks long |
| K tape blocks Y bytes long |
| L tape blocks Z blocks long |
| • • • |
| Segment Descriptor B (Control Block) |
| J tape blocks X blocks long |
| K tape blocks Y bytes long |
| L tape blocks Z blocks long |
| • • • |

FIG. 12A

| "DVDT" in Fielddata ||
|---|---|
| File Address of previous Segment Descriptor (must be given) ||
| File Address of theis Segment Descriptor (must be given) ||
| File Address of next Segment Descriptor (must be given) ||
| Maximum num of segments (must be odd) | Number of segments |
| Minus 2 - BOT ||
| Number of blocks | Block size in bytes (8-bits) |
| Number of blocks | Block size in bytes (8-bits) |
| • • • ||
| Minus 1 - EOF ||
| Number of blocks | Block size in bytes (8-bits) |
| Number of blocks | Block size in bytes (8-bits) |
| • • • ||
| Minus 1 - EOF ||
| • • • ||
| Minus 2 - End of Media (EOT) ||

FIG. 12B

METHOD AND DESIGN FOR A DVD SCSI TAPE CONTROLLER

CROSS REFERENCE TO CO-PENDING APPLICATIONS

The present application is related to co-pending U.S. patent application Ser. No. 09/590,712, filed Jun. 8, 2000, entitled "Tape Drive Emulation Software Objects, and Emulation of Other Peripheral Systems for Computers", assigned to the assignee of the present invention and incorporated herein by reference.

BACKGROUND OF THE INVENTION

1. Field of the Invention

The present invention relates generally to legacy data processing systems employing complex Input/Output processing facilities and more particularly relates to the use of such Input/Output facilities to conveniently interface with a variety of peripheral devices employing emulation and a Small Computer Systems Interface (SCSI).

2. Description of the Prior Art

A great many large organizations have enterprise-based legacy data processing systems which are integral to their very process of doing business. Embedded within such legacy data processing systems are various legacy software programs, many of which have been operating literally without any attention for a large number of years. Thus, as data processing technology has moved forward by leaps and bounds, some of the most basic and most important hardware and software elements have remained constant.

In many cases, new and upwardly compatible hardware may be added to the legacy data processing system to enhance the total throughput and provide additional functionality. In most cases, however, the most fundamental legacy software, which provides the actual logic for the business operation, remains unmodified.

Therefore, there remains a constant tension between the desire to update legacy systems with more cost effective hardware and software components and the desire to avoid costly and unreliable modifications to those system elements which are have been satisfactorily operational for extended periods of time. The most straightforward method of effecting upgrades is to couple the new hardware and software to the legacy data base management system and modify those system components requiring changes to accomplish integration. In many cases, this can mean changes to the operating system, system software, and multiple application software packages, in addition to the necessary hardware changes.

Unfortunately, this approach can be very costly, as well as, providing an adverse impact upon system reliability until all changes have been thoroughly debugged. Furthermore, this approach tends to render the system unusable for unacceptable periods of time.

SUMMARY OF THE INVENTION

The present invention overcomes the problems found in the prior art by providing a method of and apparatus for effectively and efficiently connecting a peripheral device of relatively new design to a legacy data base management system. In accordance with the preferred mode of the present invention, the legacy data processing system is a Model 2200 mainframe system available from Unisys Corporation. The newly designed device to be added is a Digital Video Drive (DVD).

The key to the approach of the present invention is emulation. In accordance with this technique, the legacy data processing system appears to interface with an older type of peripheral device for which it has been previously configured. Similarly, the new peripheral device appears to interface with an input/output facility specifically created for the newer device. The emulation is accomplished by software located within the input/output function, which integrates the new device (i.e., DVD in the preferred embodiment) with the preexisting Small Computer Systems Interface (SCSI) tape interface of the Model 220 legacy data processing system.

The novel aspects of the invention involve the basic Input/Output (I/O) system consisting of a device (e.g., DVD), a control unit, a channel, and I/O Processor, memory, and an Instruction Process (IP). In particular the invention focuses upon the control unit, channel, and I/O Processor.

The device contains a control unit that is hooked to the channel. For a SCSI tape drive, both a control unit and a device driver are integrated. This peripheral is then connected to a channel.

The channel is a PCI bus card. The card contains the micro code that interfaces with the peripheral control unit. When an operating system needs to communicate with a new channel it is sometimes necessary to interface with a new communication protocol. For example SCSI and BMC use different protocols.

The channel is connected to an I/O Processor. In the preferred mode, the I/O Processor includes the Commodity Operating System, the Commodity Application Software, and the Emulated Peripheral Software, available from the Unisys Corporation.

It is the Emulated Peripheral Software, which is the heart of the present invention. This software allows the mainframe operating system to treat the emulated peripheral (e.g., DVD) as an already existing peripheral type. As a result, there is no longer a need for the operating system to perform a large adaptation or system modification to recognize the new device, nor does the channel need to be changed. The elimination of the large adapt significantly reduces the amount of software that needs to be written as well as frees up the operating system's resources.

Essentially, when a user implements a new device such as a DVD player and/or a new set of files such as a new DVD, the operating system does not read this as requiring a change in software or a change in the channel. Instead, the emulated peripheral software hides the new device, and allows the device to be integrated into the system with minimal interruption.

More specifically, the OS 2200 operating system, available from Unisys Corporation, supports the BMC, ISI, SCSI, and SBGCON protocols. Also each control unit has unique commands and statuses for each protocol. So an operating system adapt for a new peripheral may require an entire channel adapt and will always require a control unit adapt. The present invention adds another piece of software that interfaces with a Microsoft operating system controlled DVD and eliminates the channel and control unit adapts.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 is an overall block diagram of a typical Input/Output configuration for the Unisys Corporation Model 2200 legacy data processing system;

FIG. 4A shows the format of the tape emulator Test Unit Ready command;

FIG. 4B shows the format of the Rewind command;

FIG. 5A shows the format of the Request Sense command;

FIG. 5B shows the format of the Read command;

FIG. 6A shows the format of the Space command;

FIG. 6B shows the format of the Inquiry command;

FIG. 7A shows the format of the Mode Select command;

FIG. 7B shows the format of the Mode Sense command;

FIG. 8A shows the format of the Log Sense command;

FIG. 8B shows the format of the first page of the log;

FIG. 9A shows the format of the Load-Unload command;

FIG. 9B shows the format of the Mode Select/Sense Parameter List;

FIG. 10 shows the format of the Sense Bytes;

FIG. 11A shows the format of the addition sense codes of bytes 12–13;

FIG. 11B shows the format of the inquiry data;

FIG. 12A shows the format of the VTH DVD file; and

FIG. 12B shows the format of the Segment Descriptor.

DETAILED DESCRIPTION OF THE PREFERRED EMBODIMENTS

FIG. 1 is an conceptual block diagram of the manner in which the Unisys Corporation Model 2200 handles the interface with a particular peripheral device. Instruction Processor 10 is the controlling element within the system which executes the operating system and the legacy application software. A fully populated system may contain additional Instruction Processors, depending upon the installation. The instructions and data to be utilized by Instruction Processor lo are located within Memory 12.

Within the preferred embodiment of the present system, Input/Output Processor 14 can handle most routine Input/Output operations nearly autonomously. It is a programmable device which accesses Memory 12 for execution of instructions. Input/Output data is also stored in and accessed from Memory 14. Shown in this example is a single Channel 16, which supplies the primary hardware interface and low level logic of the coupling between the Model 2200 system and the peripheral device. Most practical computer systems contain a plurality of channels and may also contain a plurality of Input/Output Processors, each with a plurality of channels.

Device 20 is a peripheral device which couples to Channel 16 via control Unit 18. If Device 20 and Control Unit 18 have been preestablished for interface with the legacy data processing system, no special modifications are necessary. Otherwise the legacy system must be adapted. This requires adding or modifying the code of the mainframe operating system software to handle the new set of commands and statuses associated with the new peripheral. Also the mainframe operating system software must add or modify code to handle a new channel type associated with the new peripheral. In addition, hardware must be added or modified in the Input/Output processor to handle a new channel type. Furthermore, a channel card must be designed and built to handle the new channel type.

Figures 2A, 2B:
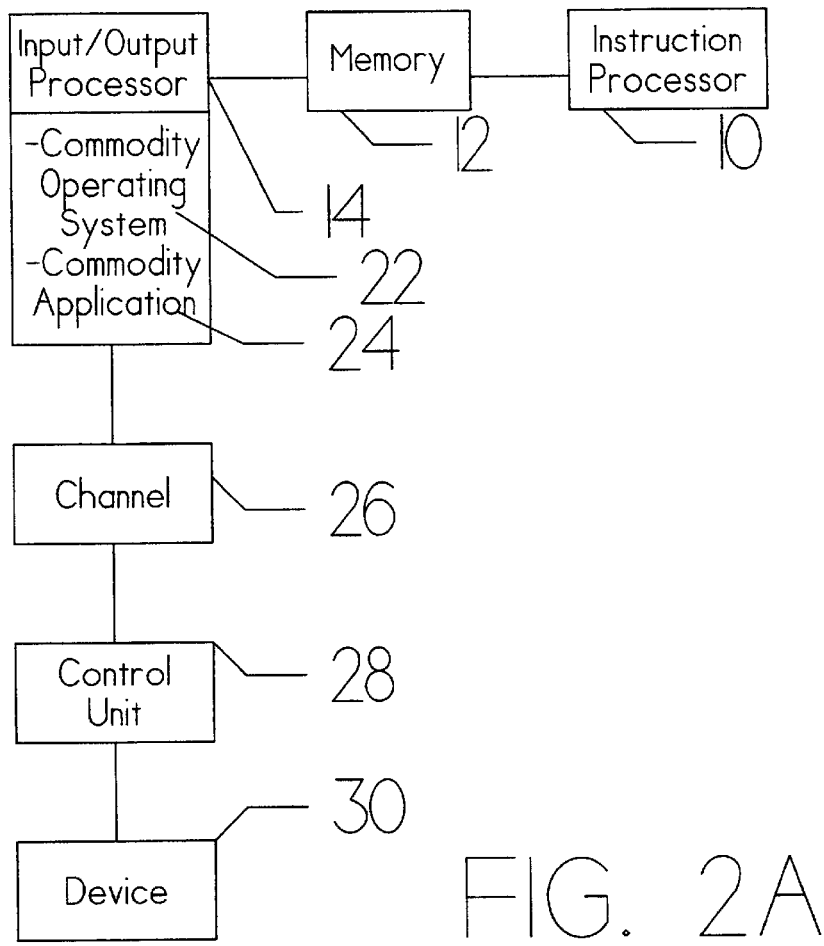
FIG. 2A is a similar block diagram showing the addition of the Commodity Input/Output facilities which handle Samll Computer System Interface.
FIG. 2B shows the format of the Commodity I/O Buffer Descriptor.

FIG. 2A is a block diagram, similar to that of FIG. 1, which shows the Unisys Model 2200 legacy data processing system modified to provide Commodity I/O processing functions. Commodity I/O is composed of hardware and a separate operating system that controls Input/Output Processor 14. Commodity operating system 22 is any widely distributed operating system such as the Microsoft NT operating system. The commodity I/O system 14 provides an interface that communicates between the commodity application 24 and the OS 2200 operating system. This interface consists of one or more (chained) commodity I/O buffer descriptors (see also FIG. 2B). The commodity application 24 communicates with the commodity operating system 22 using the Create File (of WIn32) API to open a handle to the device and the DeviceI/OControl (of Win 32) API to send the SCSI Command Descriptor Block (CDB) to the device. The physical channel 26, control unit 28, and device 30, are controlled by the commodity operating system 22. All other system elements are as previously described.

FIG. 2B show the format of the Commodity I/O Buffer Descriptor. Channel_control consists of the buffer descriptor type, data address control, chaining control, and data format. The minor and major commands are peripheral commands such as read, write, forward space block, backward space block, etc. The word_count is the number of words to transfer. The buffer_address is the memory address for the data transfer.

Figure 3:
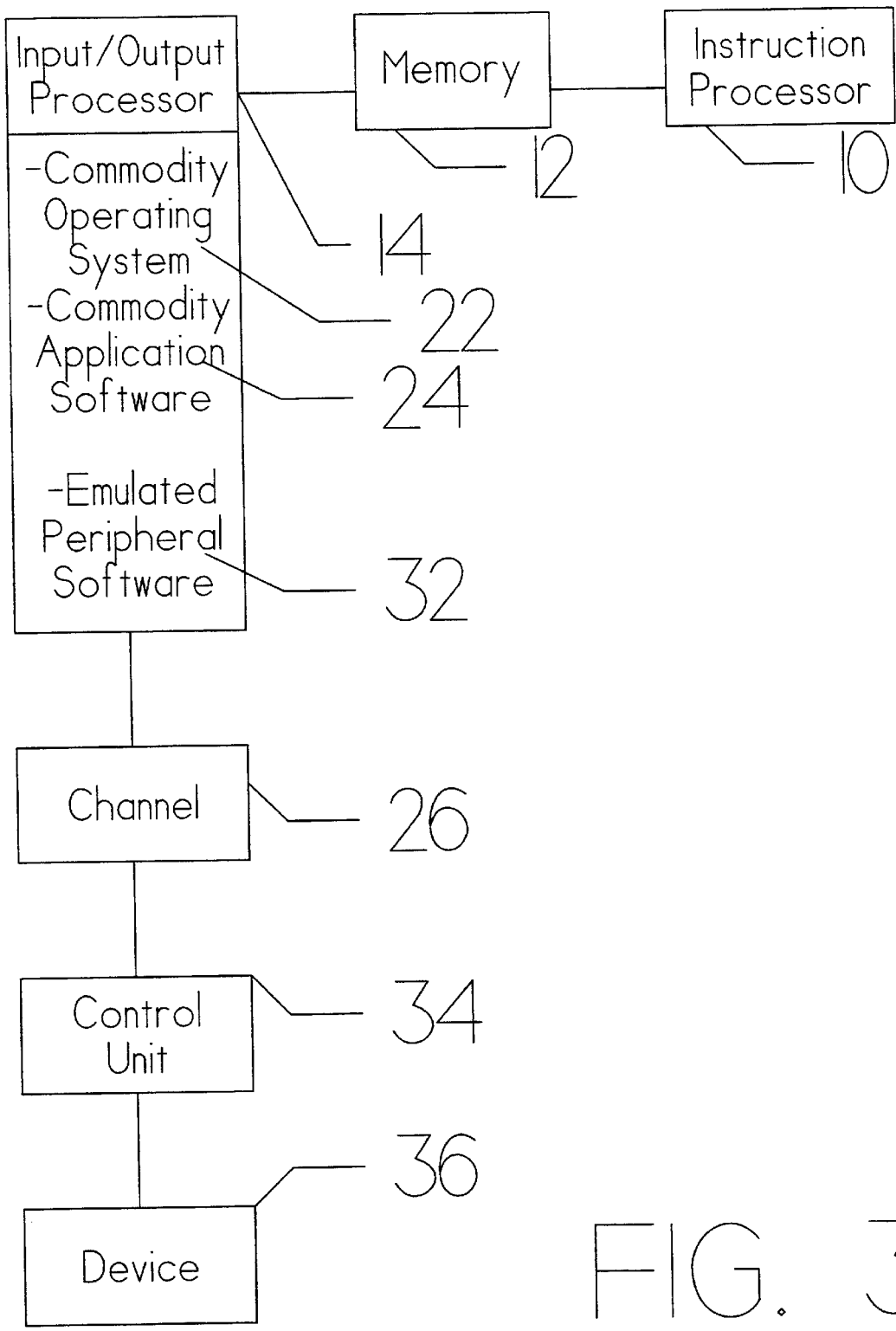
FIG. 3 is a similar block diagram showing the addition of the emulated peripheral software of the present invention.

FIG. 3 is a block diagram similar to FIG. 2 showing the addition of Emulated Peripheral Software 32 to the Commodity Input/Output Processor, in accordance with the preferred mode of the present invention. Emulated Peripheral Software 32 makes new device 36 and its corresponding control unit 34 appear as if it were device 30 and control unit 28 (see also FIG. 2). For the preferred embodiment, device 30 is a tape drive with SCSI control unit 28 and device 36 is a Digital Video Drive (i.e., DVD) coupled to channel 26 via SCSI control unit 34. Because Emulated Peripheral Software causes DVD device 36 communicating through SCSI control unit 34 to appear as tape device 30 communicating through SCSI control unit 28, the addition of Emulated Peripheral Software 32 and simple modifications to Commodity Application Software 24 are the only modification of the system to permit the legacy data processing system to utilize the new DVD device 36.

Emulated peripheral software 32 provides an interface (CDB) to a SCSI DVD device which in effect is also an emulator of a SCSI tape drive. The tape emulator supports ten command formats.

The Emulated peripheral software 32 decodes the CDB created by the commodity application 24 and communicates with the commodity operating system 14 using common file access routines (fopen, fclose, fread, fwrite, fseek). The physical channel 26, control unit 34, and device 36, are controlled by the commodity operating system 14. All other system elements are as previously described.

FIG. 4A shows the tape emulator format for the Test Unit Ready CDB. The command consists of six ordered bytes as shown. The first byte is the operation code, "00h", which indicates that it is a Test Unit Ready command. The "LUN" field specifies the Logical Unit Number.

The Test Unit Ready CDB checks if the drive unit is ready for commands involving media movement. If the drive has storage loaded, the command returns a GOOD status. Otherwise CHECK CONDITION is reported.

FIG. 4B shows the format of the Rewind CDB. The operation code in byte number one, 01h, indicates that this is a rewind command. The Rewind command tells the drive to position the storage at the beginning. The "Immed" bit is ignored.

FIG. 5A shows the format of the Request Sense CDB. Operation Code, "03h", indicates Request Sense command. The fifth byte, Allocation Length, specifies the maximum number of sense bytes to be transferred. The drive terminates the transfer when allocation length bytes have been transferred or when all the available sense data has been transferred, which ever is less.

The Request Sense CDB transfers the sense data to the initiator. The sense data is valid for a CHECK CONDITION status returned from the previous command (see also FIG. 4A). The sense data is reserved until a Request Sense command is executed, or until the receipt of any other command.

FIG. 5B shows the format of the Read CDB, signified by operation code, "08h" in the first byte position. The read command causes a transfer of one or more data blocks to the initiator starting with the next block on the drive.

If the SIL1 bit is not set and the actual block length is different from the specified transfer length, a CHECK CONDITION is returned. Within the sense data the Incorrect Length Indicator (ILI) and Valid bit is set. The Information Bytes will be set to the difference between the requested transfer length and the actual block length.

The Fixed bit must be zero. If Fixed is not zero, a CHECK CONDITION status is returned.

FIG. 6A shows the format of the Space CDB, having operation code "11h". The Space command provides a variety of positioning functions that are determined by the Code and Count fields in the Command Descriptor Block (CDB). The Code can be either 1 (blocks) or 1 (file marks). The count field can be either positive or negative (two's complement). A zero value causes no change in the logical position.

FIG. 6B shows the format for an Inquiry CDB, represented by operation code, "12h". The Inquiry command tells the drive to send information regarding the device's parameters to the initiator. The EVPD bit should be zero or a CHECK CONDITION is issued. Similarly, a CHECK CONDITION is issued if the Page Code is anything other than zero.

The Allocation Length specifies the maximum number of bytes to be transferred. The drive terminates the transfer when allocation length bytes have been transferred or when all the available inquiry bytes have been transferred, whichever is less.

FIG. 7A shows the format of the Mode Select CDB, defined by the operation code, "015h". The Mode Select command enables the host to configure the device. If the Page Format (PF) bit is set, page formatted data follows the block descriptor. Otherwise the page formatted data follows the header if no block descriptor is specified.

The SP bit should be set to zero. If not, a CHECK CONDITION is issued. The Parameter List Length specifies the length in bytes of the parameter list. The length must be correct to avoid an error condition.

FIG. 7B shows the format of a Mode Sense CDB. The Mode Sense allows the drive to report mode sense data. If the Disable Block Descriptor (DBD) bit is zero, the device lo returns the block descriptor data. If the DBD bit is set, the block descriptor data is not returned.

The PC field can be 0, 1, 2, or 3. It the PC field is 0, 2, or 3, the same sense data is returned. If the PC field is 1 (changeable), sense data is returned indicating that no fields are changeable. The Page Code field can be 9, 10h, or 3Fh.

FIG. 8A shows the format of the Log Sense CDB. The Log Sense command allows the host to retrieve statistical information maintained by the device. The PC field can be 0, 1, 2, or 3 and is ignored. The Page Code field must be 0. The Allocation Length must be specifying sufficient space to hold the log sense data.

FIG. 8B shows the format of the initial page of the sense log. These five bytes specify the extent of the sense log.

FIG. 9A shows the format of the Load-Unload CDB, assigned the operation code of "1Bh". The Load-Unload command tells the target to load or unload the media in the tape cartridge. If no tape is in the cartridge (Tape_Load method), both load and unload will return a CHECK CONDITION with a NOT READY sense key. The Immed bit is ignored. If the Load bit is set, the tape is loaded. It the Load bit is not set, the tape is unloaded.

FIG. 9B shows the format of the Mode Select/Sense Parameter List. The Sense Data length is reserved on the mode select and is valid for the mode sense. The Write Protected (WP) bit of zero indicates that the tape is write-enabled. A WP of one indicates that the tape is write protected. This field is valid for the mode sense and is ignored for the mode select.

The Media Type is ignored on the mode select. BIS(Block identifiers supported in media format) is set to one. The Enable EOD (End of Data) Generation (EEG) bit is set to indicate that the drive will generate EOD.

FIG. 10 shows the format of the Sense Bytes. The Valid Bit of byte 0 if set, indicates the information field contains valid information. Response code 70h of byte 0 indicates the reported error is current as opposed to deferred. Byte 1 contains the segment number field, which is always zero for DVD.

In byte 2, file mark (FM) of one indicates the current command has read a file mark. End of Medium (EOM) of one indicates that an end of medium condition exists. Incorrect Length indicator (ILI) of one usually indicates that the requested logical block length did not match the logical block length of the data on the medium.

The Sense Key field indicates generic information describing an error or exception condition. NO SENSE is indicated by a code of 0h, and a 2h indication means NOT READY (i.e., Tape drive is not ready). MEDIUM ERROR (Invalid tape file format) is indicated by a code of 3h, whereas a code of 4h shows HARDWARE ERROR (Invalid tape initialization). The ILLEGAL REQUEST code is 5h. The code for UNIT ATTENTION is 6h, and a code of 8h indicates BLANK CHECK.

Information (bytes 3 through 6) is residual byte count: If the block length read is less than the transfer length in the CDB, the residual value in the Information bytes is positive. If the block length read is greater than the transfer length in the CDB, the residual value in the Information bytes is negative (2s complement).

Byte 7 contains the Additional Sense Length field which has a value of 26. Additional sense bytes start at SB18. Command Specific Information (bytes 8–11) is not used for DVD and is always zero. Bytes 12–13 provide for Additional Sense Codes (ASC) and Additional Sense Code Qualifiers (ASCQ). These are explained in greater detail below with respect to FIG. 11A.

Byte 14 contains the Field Replaceable Unit Code. It is not used and should always be zero. Similarly, bytes 15–17 containing Sense Key Specific Valid data are not used and should be zero. NTEV bit of bytes 18–19, if set, indicates the NT Error byte (i.e., byte 19) is valid. The NTEV bit may be set along with any check condition. Windows Error is the Windows file error status returned (C++ errors). Remaining bytes 20–43 are always zero.

FIG. 11A is a table showing Additional Sense Codes (ASC) and Additional Sense Code Qualifiers (ASCQ) which maybe entered into bytes 12–13 of the Sene Bytes (see also FIG. 10).

FIG. 11B shows the format of the Inquiry Data returned to the requester. Each of the fields is as detailed in the drawing.

FIG. 12A shows the format for the VTH DVD data header. It is utilized to identify and specify the length of the DVD data.

FIG. 12B shows the format of the DVD data itself.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. In a legacy data processing system with a programmable input/output processor including a first facility for interfacing with a first input/output peripheral device having a first interface format wherein said programmable input/output processor does not include a second facility for interfacing with a second input/output peripheral device having a second interface format, said programmable input/output processor being internal to said legacy data processing system and providing legacy input/output processing, an improvement comprising:
   a. an emulation module having a sequence of instructions executable ok by said programmable input/output processor and respectively coupled to said programmable input/output processor, whereby said second input/output peripheral device appears to said programmable input/output processor as if it had said first interface format and said programmable input/output processor appears to said second input/output peripheral device as if it had said second facility for interfacing with said second input/output peripheral device in accordance with said second interface format.

2. A legacy data processing system according to claim 1 wherein said first interface format further comprises Small Computer System Interface (SCSI) format.

3. A legacy data processing system according to claim 2 wherein said first input/output peripheral device further comprises a tape drive.

4. A legacy data processing system according to claim 3 wherein said second input/output peripheral device further comprises a Digital Video Device (DVD).

5. A legacy data processing system according to claim 4 further comprising a Unisys Model 2200 mainframe computer.

6. An apparatus comprising:
   a. a legacy data processing system having a programmable input/output processor, said programmable input/output processor being internal to said legacy data processing system and providing legacy input/output processing;
   b. a first peripheral device having a first interface format responsively coupled to said programmable input/output processor;
   c. a second peripheral device having a second interface format; and
   d. an emulation facility having a sequence of instructions executable by said programmable input/output processor and responsively coupled to said programmable input/output processor and said second peripheral device which causes said second peripheral device to appear to said programmable input/output processor as said first peripheral device.

7. An apparatus according to claim 6 wherein said first interface format further comprises Small Computer System Interface (SCSI).

8. An apparatus according to claim 7 wherein said second peripheral device further comprises a Digital Video Device (DVD).

9. An apparatus according to claim 8 wherein said first peripheral device further comprises a tape drive.

10. An apparatus according to claim 9 wherein said legacy data processing system further comprises a mainframe computer.

11. A method for coupling a first peripheral device having a first interface format with a legacy data processing system having a programmable facility for coupling a second peripheral device having a second interface format, said programmable facility being internal to said legacy data processing system and providing legacy input/output processing, comprising:
   a. converting information transferred from said first peripheral device to said legacy data processing system from said first interface format to said second interface format by execution of software by said programmable facility, said software being responsively coupled to said programmable facility; and
   b. converting information transferred from said legacy data processing system to said first peripheral device from said second interface format to said first interface format by execution of software by said programmable facility,
   wherein said first peripheral device appears to said programmable facility as said second peripheral device.

12. A method according to claim 11 wherein said first converting step a. and said second converting step b. further comprise emulation software.

13. A method according to claim 12 wherein said second interface format further comprises Small Computer System Interface (SCSI).

14. A method according to claim 13 wherein said second peripheral device further comprises a tape drive.

15. A method according to claim 14 wherein said first peripheral device further comprises a Digital Video Device (DVD).

16. An apparatus comprising:
   a. providing means for providing legacy data processing;
   b. first means responsively coupled to said providing means for offering first peripheral device functions in accordance with a first interface format;
   c. second means for responsively coupled to said providing means for offering second peripheral device functions in accordance with a second interface format; and
   d. permitting means internal to said providing means and responsively coupled to said second offering means for permitting said second offering means to interface with said providing means, wherein said second offering means appears to said providing means as said first offering means.

17. An apparatus according to claim 16 wherein said first interface format further comprises Small Computer System Interface (SCSI).

18. An apparatus according to claim 17 wherein said second offering means further comprises a Digital Video Device (DVD).

19. An apparatus according to claim 18 wherein said first offering means further comprising a tape drive.

20. An apparatus according to claim 19 wherein said providing means further comprises a mainframe computer.

* * * * *

UNITED STATES PATENT AND TRADEMARK OFFICE
CERTIFICATE OF CORRECTION

PATENT NO. : 6,799,156 B1
DATED : September 28, 2004
INVENTOR(S) : Michael J. Rieschl It is certified that error appears in the above-identified patent and that said Letters Patent is hereby corrected as shown below:

Column 7,
Line 31, the term "ok" should be omitted.

Column 8,
Line 32, the term "first" should be omitted.
Line 33, the term "second" should be omitted.

Signed and Sealed this

Fourteenth Day of December, 2004

JON W. DUDAS
*Director of the United States Patent and Trademark Office*